United States Patent [19]

Kamikawa et al.

[11] Patent Number: 4,470,446

[45] Date of Patent: Sep. 11, 1984

[54] METHOD AND APPARATUS FOR DETECTING MOLTEN METAL SURFACE LEVEL IN A MOLD

[75] Inventors: Yoshiyuki Kamikawa, Kobe; Kazuyoshi Nenbai, Miki; Yoshitaka Nimura, Miki; Hideki Yokoyama, Miki, all of Japan

[73] Assignee: Kabushiki Kaisha Kobe Seiko Sho, Kobe, Japan

[21] Appl. No.: 280,494

[22] Filed: Jul. 6, 1981

[30] Foreign Application Priority Data

| Jul. 9, 1980 | [JP] | Japan | 55-94269 |
| Jul. 9, 1980 | [JP] | Japan | 55-94270 |
| Jul. 9, 1980 | [JP] | Japan | 55-94271 |
| Jul. 9, 1980 | [JP] | Japan | 55-97343 |
| Jul. 9, 1980 | [JP] | Japan | 55-94272 |
| Oct. 17, 1980 | [JP] | Japan | 55-148998 |

[51] Int. Cl.$^3$ .................. B22D 11/16; B22D 46/00
[52] U.S. Cl. .................. 164/451; 164/156; 164/452
[58] Field of Search .............. 164/156, 450, 451, 452, 164/453, 454, 449

[56] References Cited

U.S. PATENT DOCUMENTS

| 2,290,083 | 7/1942 | Webster | 164/450 |
| 3,677,333 | 7/1972 | Crowell | 164/452 |
| 3,692,091 | 9/1972 | Saxer | 164/156 |

FOREIGN PATENT DOCUMENTS

| 122622 | 10/1978 | Japan . |
| 42848 | 4/1979 | Japan . |
| 42846 | 4/1979 | Japan . |
| 49944 | 4/1980 | Japan . |

*Primary Examiner*—Nicholas P. Godici
*Assistant Examiner*—Jerold L. Johnson
*Attorney, Agent, or Firm*—Oblon, Fisher, Spivak, McClelland & Maier

[57] ABSTRACT

A method for detecting a molten metal surface level in a casting mold, comprises inserting an electrode in a slag constituting a layer under a flux floating on the surface of the molten metal, detecting a change of electric resistance due to a temperature gradient of the place at which the electrode is inserted, displacing the electrode to bring the detected value to be always constant within a range of from 5 to 50 Ω, and measuring the degree of the displacement of the electrode thereby detecting the surface level of the molten level. An apparatus for carrying out the method is also disclosed.

8 Claims, 17 Drawing Figures

METHOD AND APPARATUS FOR DETECTING MOLTEN METAL SURFACE LEVEL IN A MOLD

BACKGROUND OF THE INVENTION

1. Field of the Invention

The present invention relates to a method and apparatus for detecting a molten metal surface level in a casting mold for a molten metal, particularly for a continuous casting apparatus.

2. Description of the Prior Art

Heretofore, it has been difficult to continuously detect a molten metal surface level in a casting mold in a continuous casting apparatus since the molten metal to be treated has a high temperature. As a solution to this difficulty, Japanese Patent Publication No. 42848/79 discloses a method in which an electrode is inserted in slag constituting a layer under flux floating on the surface of molten metal, detecting a change of electric resistance due to a temperature gradient of the location at which the electrode is inserted, wherein the electrode is displaced upwardly or downwardly to cause the detected value to be constant and the degree of displacement is measured.

Other than the above noted method, there have been proposed some techniques for detecting a molten metal surface level in a casting mold in a continuous casting apparatus in Japanese Laid-open Patent Application No. 122622/78, Japanese Patent Publication No. 49944/80 and Japanese Patent Publication No. 42846/79.

The present invention is concerned particularly with an improvement over the method for detecting a molten metal surface level in a mold as disclosed in Japanese Patent Publication No. 42848/79.

SUMMARY OF THE INVENTION

An object of the present invention is to provide a method and apparatus capable of detecting a molten metal surface level in a mold with a high degree of accuracy and dependability and which can readily be adapted for practical applications.

Thus, the present invention provides a method for detecting a molten metal surface level in a mold, which includes inserting an electrode in slag constituting a layer under a flux floating on the surface of molten metal in the mold, thereby detecting a change of electric resistance due to a temperature gradient of the location at which the electrode is inserted, and displacing the electrode upwardly or downwardly to bring the detected value to be constant. The degree of the displacement of the electrode is measured to detect the surface level of the molten metal. The method is characterized in that the detected value is kept constant within a range of from 5 to 50Ω.

The present invention also provides an apparatus for carrying out the method, which includes an electrode to be inserted in slag constituting a layer under flux floating on the surface of molten metal, a generator for conducting a constant current to the electrode, a resistance measuring device for measuring electric resistance between the electrode and the molten metal, a resistance setting device for providing a predetermined resistance within a range of from 5 to 50Ω, a differential amplifier for generating an output corresponding to the difference between the electric resistance measured by the resistance measuring device and the predetermined resistance and a power amplifier for converting the output of the differential amplifier to a controlling output for a servo motor. The servo motor is driven by the controlling output, and a lifting device is driven by the servo motor for up-and-down movement to displace the electrode to a position where the resistance between the electrode and the molten metal corresponds to the predetermined resistance preset by the resistance setting device. Further, a mechanism for measuring the displacement of the electrode is provided.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
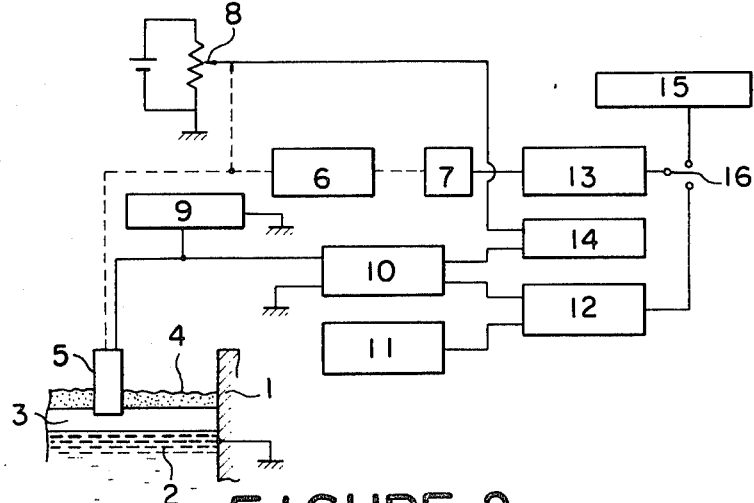
FIG. 1 is a block diagram of an apparatus for carrying out the method of the present invention.

Referring to FIG. 1, during casting operation, molten metal 2 is introduced into a mold 1 of a continuous-casting apparatus, and at the same time, flux is introduced onto molten metal 2. On molten metal 2 is formed a layer of slag 3 of the molten flux and a layer of flux 4 on the slag layer, as is well known.

An electrode of a rod-like shape made of a material having a high melting point, such as carbon, is inserted from above mold 1 into flux 4 so that the lower end thereof is located in slag 3. The electrode is suspended in such a manner that it is movable in an up-and-down direction by means of a mechanical lift device 6 including e.g. an upwardly and downwardly movable arm or a wire adapted to be wound or unwound on a drum. Lift device 6 is driven by a servo-motor 7, and electrode 5 is moved upwardly or downwardly by the regular or reversed rotation of servo-motor 7. Lift device 6 is provided with, e.g. a linear line type potentiometer 8 whereby displacement of electrode 5 is taken out as an output.

A constant current is conducted to electrode 5 by constant current generator 9 and resistance between electrode 5 and molten metal 2 is detected by means of a resistance measuring device 10. The output of resistance measuring device 10 is compared, by means of a differential amplifier 12, with a predetermined resistance of from 5 to 50Ω preset by a resistance setting device 11, and the difference is converted to a controlling output for servo-motor 7 by a power amplifier 13. By controlling the output, servo-motor 7 is controlled its operation to drive lift device 6 in up-and-down movement. In other words, when the level of molten metal 2 in mold 1 changes, the output of resistance measuring device 10 accordingly changes, and servo-motor 7 is operated depending upon output of the differential amplifier 12 corresponding to the difference between the output of resistance measuring device 10 and the preset value of resistance setting device 11, whereby lift device 6 is driven in an up-and-down movement to move electrode 5 to a position where the resistance between electrode 5 and molten metal 2 always corresponds to the predetermined value set by resistance setting device 11. Such up-and-down movement of the electrode 5 is measured by, e.g. a potentiometer 8 thereby detecting the surface level of molten metal 2. The output of resistance measuring device 11 and the output of potentiometer 8 are continuously recorded by a recorder 14.

Figure 2:
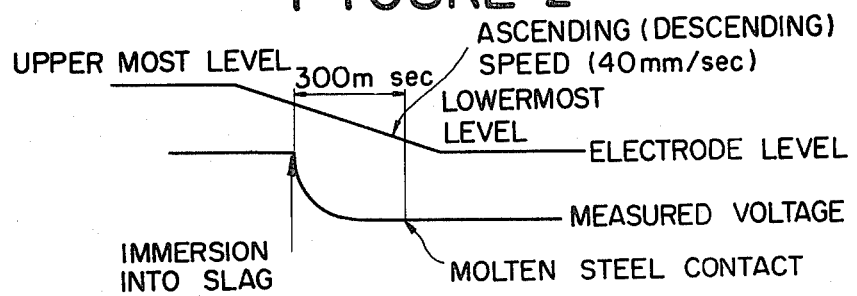
FIG. 2 is a diagram illustrating a manner of obtaining curves relating to an electrode position D and a resistance change R.

In order to select a predetermined resistance to be set by resistance setting device 11, or in other words, in order to measure the relation between the distance D between molten metal 2 and the electrode (i.e. the position of the electrode) and the resistance R between molten metal 2 and the electrode (i.e. the level resistance), a rotational speed setting device 15 is provided so that power amplifier 13 is controlled by the output thereof. Namely, by switching over a switch 16 to disconnect power amplifier 13 from differential amplifier 12 and at the same time connecting power amplifier 13 to rotational speed setting device 15, servo-motor 7 is driven at a constant speed by rotational speed setting device 15 so that electrode 5 descends in slag 3 from the contact surface of the flux layer to the surface of molten metal 2 at a constant speed, e.g. at 40 mm/sec, and the continuously changing level resistance at each location is detected by the resistance measuring device 10 and recorded on the recorder 14 as shown in FIG. 2.

Figure 3:
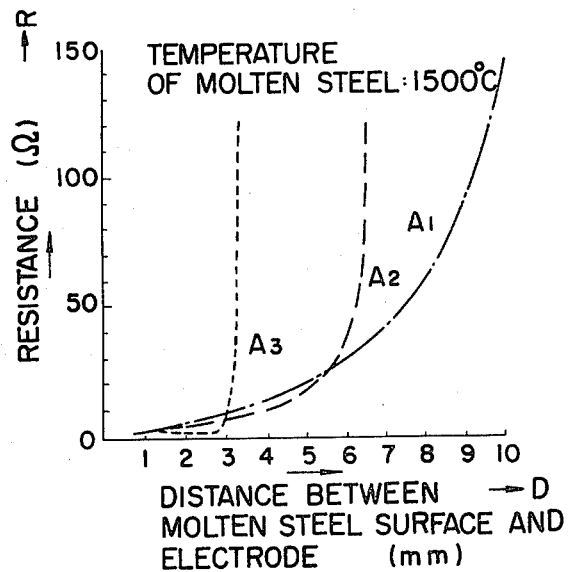
FIG. 3 is a graph showing D-R curves obtained according to FIG. 2.

Electrode position-level resistance curves thus obtained, are shown in FIG. 3. The temperature of molten metal 2 at the time of the measurement was 1500° C. Curve $A_1$ represents a D-R curve in a case where the thickness of the slag layer was 10 mm. Where R is within a range of 5 to 50Ω, D undergoes a smooth stepwise change corresponding to the change of R. Accordingly, it is seen that D changes substantially linearly corresponding with the change of the resistance in the vicinity of the predetermined resistance optionally set within a range of from 5 to 50Ω. In other words, it is possible to ensure the mutual control of D and R within this range. That is, since the electrical resistance of the molten flux (i.e., the slag) is a function of the temperature gradient within the slag layer, and since the temperature gradient within the slag layer is a function of the distance between the electrode and the surface of the molten metal, the electrical resistance is ultimately a function of the distance between the electrode and the surface of the molten metal. Of course, the desired steady-state value of the electrical resistance depends upon the composition of the flux used (i.e., upon the electrical resistance characteristics of that particular flux). However, the level meter used in this invention may be used to preliminarily measure those characteristics.

Referring to curve $A_1$, when R is less than 5Ω, the curve is substantially horizontal and the change of R corresponding to the change of D is small, and accordingly, a so-called following up characteristic is extremely poor. On the other hand, when R is greater than 50Ω, the curve is substantially vertical, and the change of D corresponding to the change of R is small, and accordingly, a so-called hunting phenomenon is likely to occur in which the electrode vibrates outside the controllable range. Further, if the predetermined resistance value is set at a level of less than 5Ω, there is a undesirable possibility that the electrode is undesirably plunged into molten metal 2 and the molten metal deposits on the electrode. On the other hand, if the resistance value is set at a level greater than 50Ω, there is a possible of danger of the electrode being pulled out of the flux and cooled, and slag being deposit on the electrode.

Further, curve $A_2$ is a D-R curve in the situation where the thickness of the slag layer is 6 mm. Where a R is in the range from 5 to 50Ω, R and D change substantially linearly in a same manner as in the case of $A_1$, and D undergoes a smooth stepwise change corresponding with the change of the resistance in the vicinity of the predetermined resistance value optionally set within a range of from 5 to 50Ω. Accordingly it is possible to ensure the mutual control of D and R within the range.

Further, curve $A_3$ is a D-R curve in the situation where the thickness of the slag layer is 3 mm. In this case, the curve is substantially horizontal if R is less than 5Ω, and it is substantially vertical if R is more than 5Ω. Thus, a linear relation between D and R is not obtainable in either range, and it is difficult to obtain a predetermined value for R suitable for the control of D.

Having thus described a preferred embodiment of the present invention, it should be understood that the present invention provides a method for detecting a molten metal surface level in a mold, which includes inserting an electrode in slag constituting a layer beneath flux floating on the surface of the molten metal in the mold, thereby detecting a change of an electric resistance resulting from a temperature gradient at the position of the electrode, displacing the electrode upwardly or downwardly to bring the detected value to be constant, and measuring the degree of the displacement, and which is characterized in that the detected value is constant within a range of from 5 to 50Ω. By setting the detected value to be constant within the above-noted range, it is possible to ensure the detection of the molten metal surface level by displacing the electrode upwardly or downwardly depending upon the change of resistance within a range in which the displacement of the electrode and the change of resistance are in a linear relation to each other.

Figure 4:
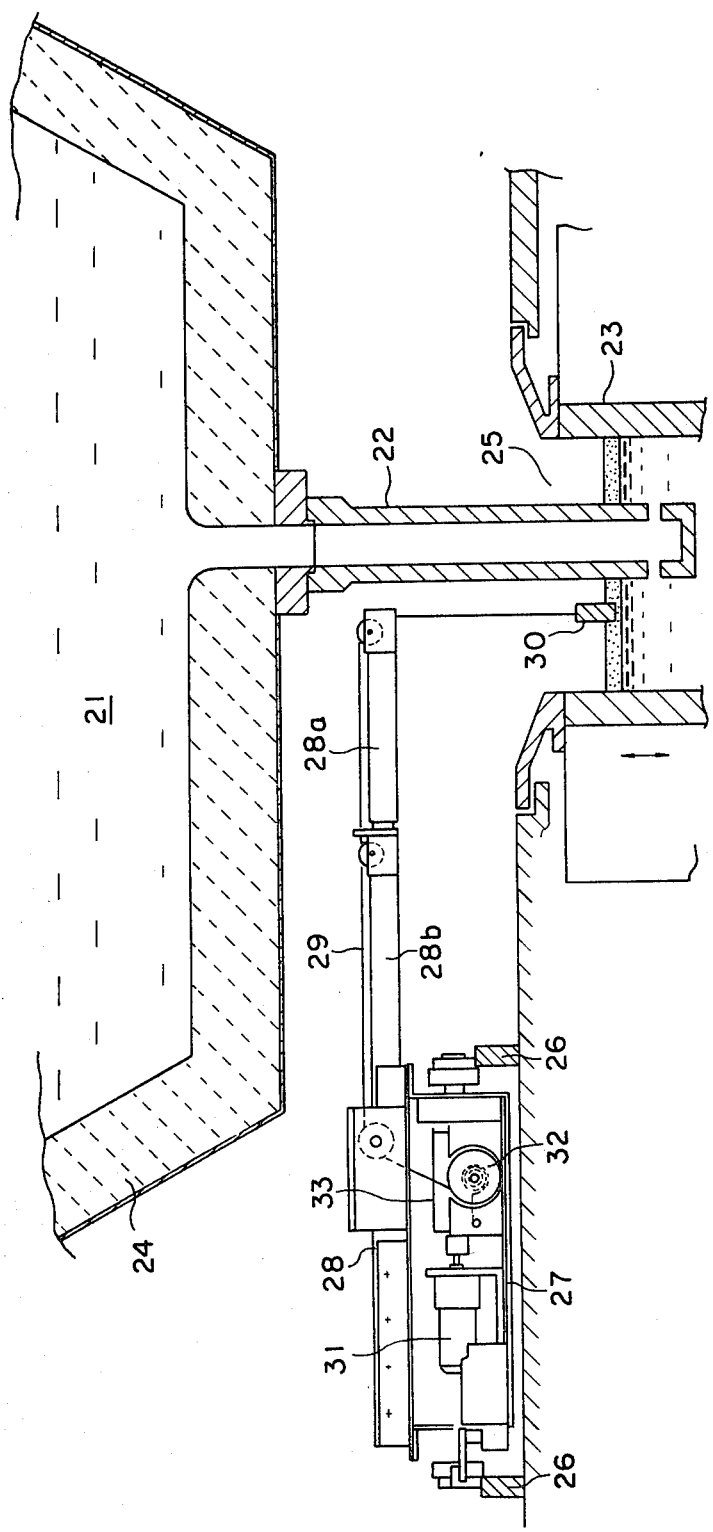
FIG. 4 is a schematic side view of an apparatus for detecting a molten metal surface level according to another embodiment of the present invention.

An apparatus for measuring the molten metal surface level in a casting mold, which is used for carrying out the method of the present invention, now described with reference to FIG. 4.

The apparatus includes a tundish 24 for supplying a molten metal 21 through a nozzle 22 to a casting mold 23, a platform car 27 capable of travelling on rails 26, 26 provided beside an inlet 25 of casting mold 23 in a narrow space between the tundish 24 and casting mold therebelow, and a long arm 28 mounted on the platform car 27 and including a rear arm 28b and a front arm 28a detachably connected to each other and extending towards above the inlet 25 of casting mold 23. A wire 29 extends along long arm 28 and an electrode 30 is suspended by the forward end of the wire 29 hung from the front arm 28a into inlet 25 and rear end of the wire 29 extends beyond rear arm 28b and is wound up on a drum 32 which is adapted to be driven for rotation in a normal or reverse direction by an electric motor 31 mounted on the platform car 27. A potentiometer 33 is provided to measure the degree of the winding or unwinding of the wire.

Other than the above construction, a rotary type construction wherein platform car 27 is placed on a rotary stand (not shown) instead of rails 26, or a fixed type construction wherein platform car 27 is placed on a fixed frame (not shown) instead of rails 26 and secured to e.g. a tundish car, may be used. Further, while the rails are fixed, the main body of the level measuring mechanism may be made to be automatically driven back and forth. Furthermore, the arm of the level measuring means may be made movable up-and-down by rotating a ball screw (not shown).

Thus, the wire having an electrode suspended at its forward end and extending from the drum beside the inlet of the casting mold, is hung down into the inlet of the casting mold. The wire is wound up or unwound depending upon the value detected by the electrode, thereby displacing the electrode upwardly or downwardly, and the degree of the winding or unwinding is measured by, e.g. a potentiometer. With such measuring method, a wide range of measurements may be attainable from the initial stage of the casting in the narrow space between the tundish and the casting mold.

Figure 5:
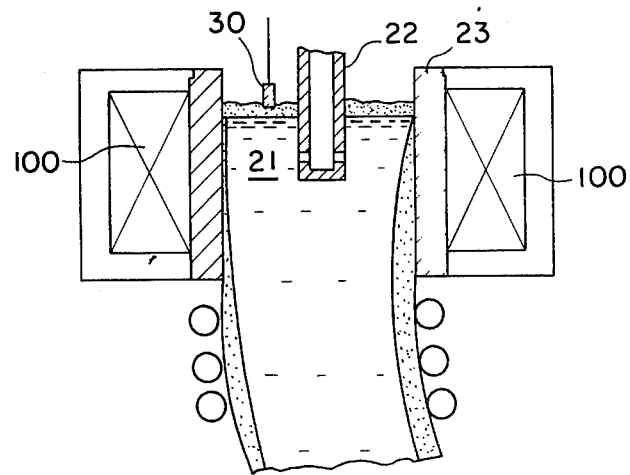
FIG. 5 is a schematic cross sectional view of a further embodiment of the invention.
Figure 6:
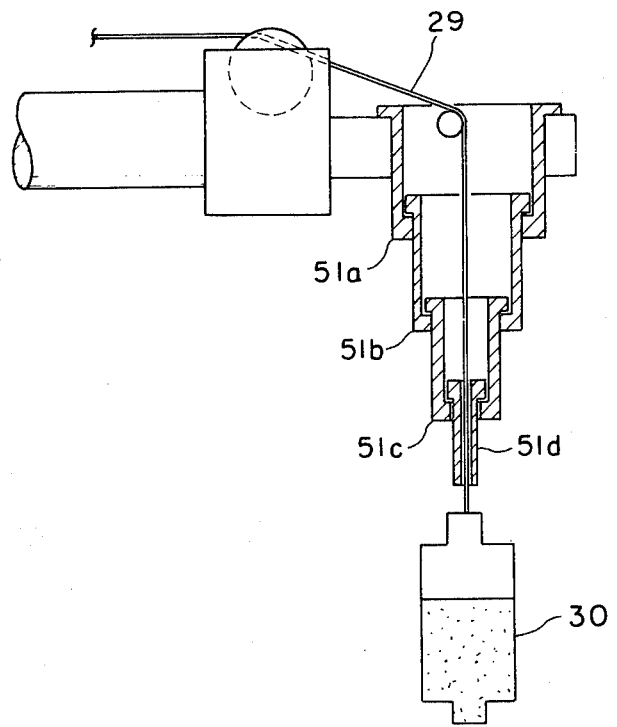
FIG. 6 is a schematic side view of an electrode stabilizing device for carrying out the method of the present invention.

Further, it is possible to provide billets having no internal defects by electromagnetic stirring of molten metal 21 supplied into casting mold 23 by nozzle 22 by conducting an alternating current to an electromagnetic coil 100 provided outside casting mold 23, as shown in FIG. 5.

Further, as a second embodiment of the present invention, there is an electrode stabilizing device for preventing vibration of electrode 30 due to the flow of the molten metal caused by the electromagnetic force. The electrode stabilizing device has a structure in which the lower most guide shaft is made of a pipe 51d having a small inner diameter, and wire 29 passes through pipes 51a, 51b, 51c and 51d. Thus, in a molten metal surface level measuring apparatus of a wire hanging type, an electrode stabilizing device is provided which includes an expansion-and-contraction mechanism movable upwardly or downwardly corresponding with the winding or unwinding of the wire and adapted to allow the wire to pass therethrough and maintain the wire free from vibration at a position close to the position at which the electrode is suspended.

Figure 7A:
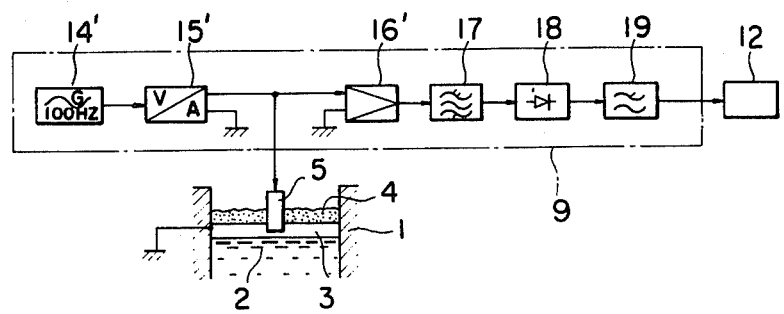
FIG. 7(a) is a diagram showing a circuit as one embodiment of the resistance measuring device of FIG. 1, and FIGS. 7(b) to 7(g) are graphs showing output voltage wave forms at various parts.

In the level detecting apparatus of FIG. 1, resistance measuring device 9 includes, as shown in FIG. 7(a), a generator 14' for generating a constant current, a volt-ampere converter 15' and an output treating circuit having a voltage amplifier 16', a band-pass filter 17, a rectifier 18 and a low-pass filter 19. The output of volt-ampere converter 15' is applied to electrode 5, output of the electrode 5 is then treated by the treating circuit, and the output of the treating circuit is applied to differential amplifier 12.

Figures 7B, 7C:
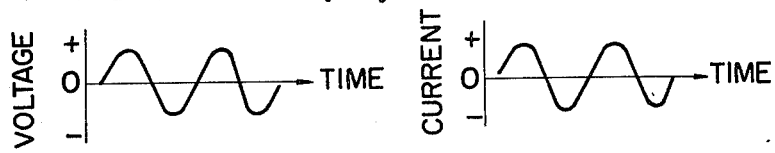
Figure 7D:
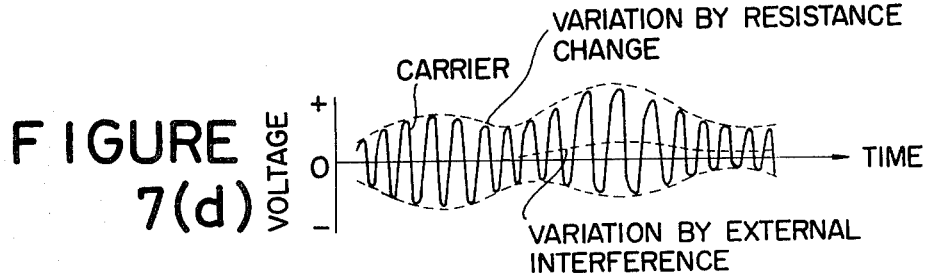
Figure 7E:
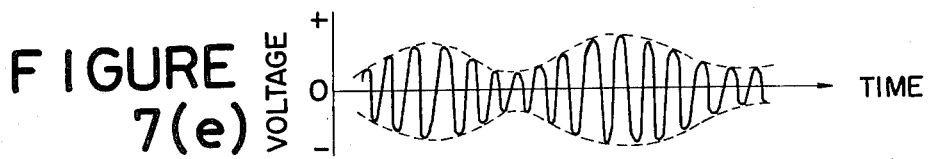
Figure 7F:
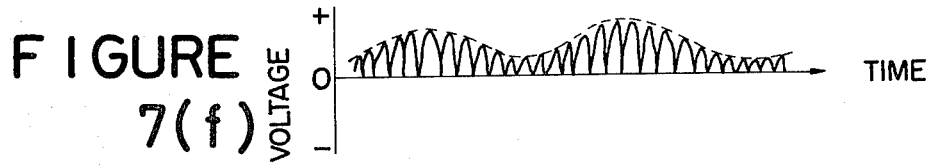
Figure 7G:
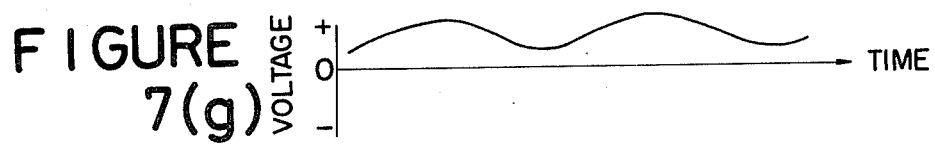

As shown in FIG. 7(b), generator 14' generates a sine wave voltage having a frequency which is different from the frequency of a predictable external interference such as electromagnetic stirring. Normally, the electromagnetic stirring is at most 15 Hz and the commercial power source is from 50 to 60 Hz, and therefore, the carrier frequency of the generator is usually set at a level of from 100 to 500 Hz. Upon receiving output of generator 14', the volt-ampere converter 15' converts the output to a carrier constant current, as shown in FIG. 7(c), and applies it to electrode 5. Voltage amplifier 16' detects the voltage between electrode 5 and molten metal 2 and generates a measured voltage drop wave form (shown in FIG. 7(d)) composed of a mixture of a variable wave due to a change of the resistance value between the electrode and the molten metal, a variable wave due to the external interference and the above mentioned carrier wave. Upon receipt of the measured voltage drop wave form from voltage amplifier 16, band-pass filter 17 cuts off the upper and lower frequency regions of the carrier wave frequency and thereby generates a carrier wave component corresponding to the quantity of the voltage drop having the variable wave due to the external interference removed, as shown in FIG. 7(e). Rectifier 18 receives the wave form passed through band-pass filter 17, converts the alternating current to a direct current, and generates a thus rectified smooth wave form as shown in FIG. 7(f). Low-pass filter 19 receives the rectified wave form from rectifier 18, eliminates the carrier frequency and thereby generates only the variable wave corresponding to the change of the resistance value between the electrode and the molten metal, as shown in FIG. 7(g). The variable wave from low-pass filter 19 is fed to differential amplifier 12. Thus, input of the differential amplifier 12 is free from a noise due to the electromagnetic stirring coil or other external interference and the carrier wave, and is accordingly composed purely of the variable wave corresponding to change of the resistance value between the electrode 5 and molten metal 2. With the use of such an input, it is possible to accurately detect the surface level of molten metal 2.

Further, FIG. 3 is a graph showing the relation between the resistance value R between the molten metal and the electrode as measured by resistance measuring device 10 and the distance D between the molten metal surface and the electrode as measured by potentiometer 8. Curves $A_1$, $A_2$, and $A_3$ represent cases wherein the thickness of the slag layer on a molten metal at a temperature of 1500° C. is 3 mm, 6 mm and 10 mm, respectively. Normally, slag layer 3 in which the electrode is located has a certain resistance gradient corresponding to a temperature gradient from the high temperature region facing the molten metal to the low temperature region in contact with the flux layer, and accordingly, it is usually possible to determine the distance between the electrode and the molten metal by measuring the resistance between the electrode and the molten metal.

In the determination of the molten metal surface level, slag layer 3 is formed by flux 4 fed and melted on the surface of the molten metal and must have a sufficient thickness so as to have a moderate resistance gradient so that the resistance at each location can be measured accurately. The present inventors have conducted various experiments and, as a result, have found that with use of a heat insulating flux as the flux 4, it is possible to readily form slag having a sufficient thickness and a flux layer having a good heat insulating effectiveness and it is possible to ensure measurement of resistance at each location by setting the depth of the slag within a range of from 3 to 15 mm. The heat insulating flux is composed, for instance, of 36.6% of $SiO_2$, 34% of CaO, 5.5% of $Al_2O_3$, and 4.6% of F. As opposed to a conventional melt-type flux composed mainly of $Na_2SiO_3$ and $CaF_2$, it is hardly converted to slag, and when cooled, it hardly brings about slag adhesion and, accordingly, a slag layer having sufficient thickness is obtainable depending upon the amount of the flux introduced on the molten metal.

Electrode 5 used in the apparatus of the present invention shown in FIG. 1 is inserted, by the suspending mechanism, through flux layer 4 into slag 3 to detect resistance between the molten metal 2 and itself. It is required to be readily inserted into the slag and to have a sufficient frictional resistance and a sufficient wetting resistance against the molten metal and the slag. As a result of various experiments, the present inventors have found that good frictional and wetting resistance of the electrode is obtainable with use of carbon (without coating) or Thermo Alloy as a material for the electrode. The results obtained by the experiments conducted on various materials are as shown in Table 1.

TABLE 1

| | Material | Wetting Property | Durability |
|---|---|---|---|
| 1. | Titanium | good | — |
| 2. | Stainless steel | good | — |
| 3. | Piano wire | — | Not durable for use for a long period of time |
| 4. | Platinum | good | — |
| 5. | Carbon + Ceramic insulator coating | — | Not durable for use for a long period of time |
| 6. | Carbon + heat resistant bricks coating | — | Not durable for use for a long period of time |
| 7. | Carbon + good aluminum coating | — | — |
| 8. | Carbon + boron nitride coating | good | — |
| 9. | Carbon (without coating) | no good | Small consumption |
| 10. | Mo + $ZrO_2$ (sintered body) THERMO ALLOY (trademark) manufactured by Toho Kinzoku Co., Ltd. | no good | Small consumption |

Figures 8A, 8B, 8C, 8D:
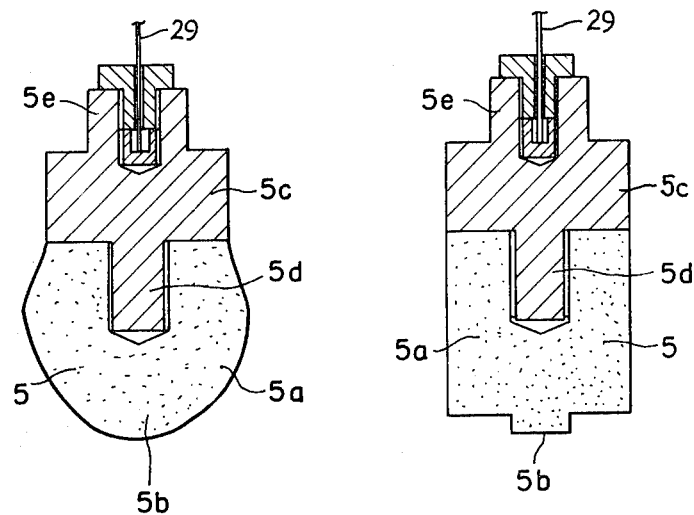
FIGS. 8(a) to 8(d) are cross sectional side views of electrodes to be used for the apparatus for carrying out the method of the present invention.

As shown in Table 1, among these materials for electrodes, carbon and Thermo Alloy satisfy the requirements for the wetting resistance against slag adhesion and the durability for repeated use. Further, it has been confirmed that they have an extremely good response to the change of the resistance. Further, when the electrode is formed of a cylindrical shape and inserted into the slag vertically with its center portion located in the flux, the portion located at the boundary between the atmosphere and the flux as shown FIGS. 8(a) and 8(b), wears out in the maximum degree. It is possible to increase the durability by forming that portion thicker than other portions so as to give a barrel shape as a whole, as shown in FIG. 8(c).

The electrode made of carbon has a smaller specific gravity than that of a slag constituting a layer under a flux normally used. In order to facilitate the insertion of the electrode into the flux and slag, a protrusion 5b having a diameter of e.g. 10 mm$\phi$ and thus having a smaller surface pressure is provided at the forward end of the main body 5a of the electrode of a rod shape as shown in FIG. 8(d), so that the electrode is inserted in a needle like manner with its protrusion 5b as the leading front, and at the same time, a stainless steel block 5c having a greater specific gravity is integrally provided at the upper portion of the main body 5a of the electrode so that the electrode is forcibly inserted by the gravity of the stainless steel block. The main body 5a of the electrode and the stainless steel block 5c are integrally connected by a screw engagement member 5d, and a securing portion 5e for the wire 29 is provided at the upper portion of stainless steel block 5c. With such a construction, the electrode can readily be inserted into the flux and slag by virtue of protrusion 5b and stainless steel block 5c, and the durability and the wetting resistance against slag adhesion can be improved by forming the electrode with the use of carbon or Thermo Alloy. Thus, it is possible to accurately measure the resistance between the molten steel and the electrode, and the electrode is extremely valuable for practical applications.

As is apparent from the foregoing illustration, according to the method and apparatus of the present invention, a molten metal surface level within a casting mold can be detected with ease and with a high degree of accuracy and high responsibility in an actual operation.

Obviously, many modifications and variations of the present invention are possible in the light of the gist of the above teachings. It is to be understood therefore that within the scope of the appended claims, the present invention may be practiced otherwise than as specifically described herein.

What is claimed as new and desired to be secured by Letters Patent of the United States is:

1. A method of measuring the surface level of molten metal in a mold, said method comprising the steps of:
    (a) suspending an electrode by a wire in a layer of slag floating on the surface of the molten metal, said layer of slag having a temperature gradient extending from its lower surface to its upper surface;
    (b) measuring the electrical resistance value R between the electrode and the surface of the molten metal, which electrical resistance value R is a function of both the distance between the electrode and the surface of the molten metal and the temperature of the slag between the electrode and the surface of the molten metal;
    (c) selecting a desired electrical resistance value representative of a certain distance between the electrode and the surface of the molten metal;
    (d) detecting changes of the electrical resistance value R from said desired electrical resistance value due to changes in the height of the surface level of the molten metal, which changes in turn causes changes in the vertical location of the electrode in the layer of slag;
    (e) displacing the electrode upwardly or downwardly to return the measured electrical resistance value R to said desired electrical resistance value by winding or unwinding said wire;
    (f) measuring the displacement of the electrode required to return the measured electrical resistance value R to said desired electrical resistance value; and
    (g) maintaining the electrode free from vibration by providing an expansion-and-contraction mechanism surrounding said wire in the vicinity of the electrode, which expansion-and-contraction mechanism permits the wire to move freely up and down but resists side-to-side movement of said electrode.

2. A method of measuring the surface level of molten metal in a mold as recited in claim 1 wherein:
(a) the molten metal is steel and
(b) said desired electrical resistance value is between 5 ohms and 50 ohms.

3. A method of measuring the surface level of molten metal in a mold as recited in claim 2 wherein the depth of the layer of slag is within a range of from 3 mm to 15 mm.

4. A method of measuring the surface level of molten metal as recited in claim 1:
(a) wherein an electromagnetic coil is disposed around the mold and
(b) further comprising the step of applying an alternating current to the electromagnetic coil, thereby stirring the molten metal in the mold.

5. A method of measuring the surface level of molten metal in a mold as recited in claim 4 wherein step (d) in claim 1 is effected by:
(a) applying a carrier constant current or a carrier constant voltage to the electrode;
(b) detecting the output of the electrode as a voltage value or a current value;
(c) passing the output of the electrode through a band-pass filter and a low-pass filter; and
(d) detecting the remaining rectified smooth wave form, which wave form corresponds to the change of the electrical resistance value R.

6. A method of measuring the surface level of molten metal in a mold as recited in claim 1 wherein:
(a) the molten metal is steel and
(b) the depth of the layer of slag is within a range of from 3 mm to 15 mm.

7. A method of measuring the surface level of molten metal in a mold as recited in claim 6:
(a) wherein the slag is derived from a heat insulating flux and
(b) further comprising the step of feeding the flux to the mold in sufficient quantity to maintain the depth of the layer of slag within a range of from 3 mm to 15 mm.

8. A method of measuring the surface level of molten metal in a mold as recited in claim 1:
(a) wherein the slag is derived from a heat insulating flux and
(b) further comprising the step of feeding the flux to the mold in sufficient quantity to maintain the depth of the layer of slag in a desired range.

* * * * *

UNITED STATES PATENT AND TRADEMARK OFFICE
CERTIFICATE OF CORRECTION

PATENT NO. : 4,470,446

DATED : Sep. 11, 1984

INVENTOR(S) : Kamikawa et al.

Page 1 of 2

It is certified that error appears in the above-identified patent and that said Letters Patent is hereby corrected as shown below:

Title page:

In Abstract, line 3, change "constituting" to -- which includes --;

In Abstract, line 9, insert "to" before "thereby";

In Abstract, line 10, change "detecting" to --detect--;

In column 1, lines 1-2, insert "A" in title before "Molten Metal Surface Level ... Mold";

In column 1, lines 6 and 11, delete numerals "1" and "2" in sub headings "Field of the Invention" and "Description... Prior Art";

In column 3, line 7, insert "during" before "its operation";

In column 4, line 14, delete "undesirable";

In column 4, line 17, insert "of" after "level" and before "greater";

UNITED STATES PATENT AND TRADEMARK OFFICE
CERTIFICATE OF CORRECTION

PATENT NO. : 4,470,446

DATED : Sep. 11, 1984

INVENTOR(S) : Kamikawa et al.

It is certified that error appears in the above-identified patent and that said Letters Patent is hereby corrected as shown below:

In column 4, line 18, delete "of" before "danger";

In column 4, line 19, change "deposit" to -- deposited --;

In column 4, line 22, delete "a" before "R";

In column 4, lines 60-61, change "now described" to -- will now be described --;

In column 5, line 62, insert "the" before "output";

In column 6, line 17, change "16" to -- 16' --;

In column 7, line 25, in table, change "Material" in heading to -- Materials --;

In column 7, line 35, in table 1, move "good" under heading "Materials" and put it under "Wetting Property" instead;

In column 7, line 56, change "in the maximum degree" to -- the maximum degree --.

Signed and Sealed this

Sixteenth Day of April 1985

[SEAL]

Attest:

DONALD J. QUIGG

Attesting Officer     Acting Commissioner of Patents and Trademarks